(12) United States Patent
Au-Yeung et al.

(10) Patent No.: US 8,411,776 B2
(45) Date of Patent: Apr. 2, 2013

(54) SYSTEM AND METHOD FOR QUANTIZATION OF CHANNEL STATE VECTORS

(75) Inventors: Chun Kin Au-Yeung, West Lafayette, IN (US); Shahab Sanayei, Richardson, TX (US)

(73) Assignee: FutureWei Technologies, Inc., Plano, TX (US)

( * ) Notice: Subject to any disclaimer, the term of this patent is extended or adjusted under 35 U.S.C. 154(b) by 530 days.

(21) Appl. No.: 12/633,376

(22) Filed: Dec. 8, 2009

(65) Prior Publication Data

US 2011/0135020 A1    Jun. 9, 2011

(51) Int. Cl.
*H04L 5/12* (2006.01)
(52) U.S. Cl. ........ 375/265; 375/262; 375/340; 375/341; 714/792
(58) Field of Classification Search ................... 375/265, 375/262, 316, 324, 340, 341; 714/796, 792
See application file for complete search history.

(56) References Cited

U.S. PATENT DOCUMENTS

| 8,000,300 | B2 * | 8/2011 | Ishii et al. ................... 370/331 |
| 2003/0043928 | A1 * | 3/2003 | Ling et al. ................... 375/267 |
| 2006/0092902 | A1 * | 5/2006 | Schmidt ...................... 370/342 |

FOREIGN PATENT DOCUMENTS

| CN | 101212758 | 7/2008 |
| CN | 101422062 A | 4/2009 |
| EP | 2 037 586 A1 | 3/2009 |

OTHER PUBLICATIONS

Au-Yeung, C.H., et al., "Trellis Coded Beamforming Vector Quantization with Fractional Bits Per Antenna," 2009 Conference Record of the Forty-Third Asilomar Conference on Signals, Systems and Computers, Nov. 1-4, 2009, 2 pages.
Au-Yeung, C.H., et al., "Insights Into Feedback and Feedback Signaling for Beamformer Design," 2009 Information Theory and Applications Workshop, 2009, pp. 187-190.
Applicant: Huawei Technologies Co. Ltd., et al., Internationl Search Report and the Written Opinion of the International Searching Authority, International Application No. PCT/CN2010/079491, Mar. 17, 2011, 10 pages.

* cited by examiner

*Primary Examiner* — Ted Wang
(74) *Attorney, Agent, or Firm* — Slater & Matsil, L.L.P.

(57) ABSTRACT

A system and method for the quantization of channel state vectors is provided. A method for communications node operation includes measuring a communications channel between the communications node and a controller, generating channel state information based on the measurement, computing a bit representation of the channel state information, transmitting the bit representation to the controller, and receiving a transmission from the controller. The computing makes use of tail-biting trellis decoding, and the transmission makes use of the channel state information transmitted by the communications node.

15 Claims, 8 Drawing Sheets

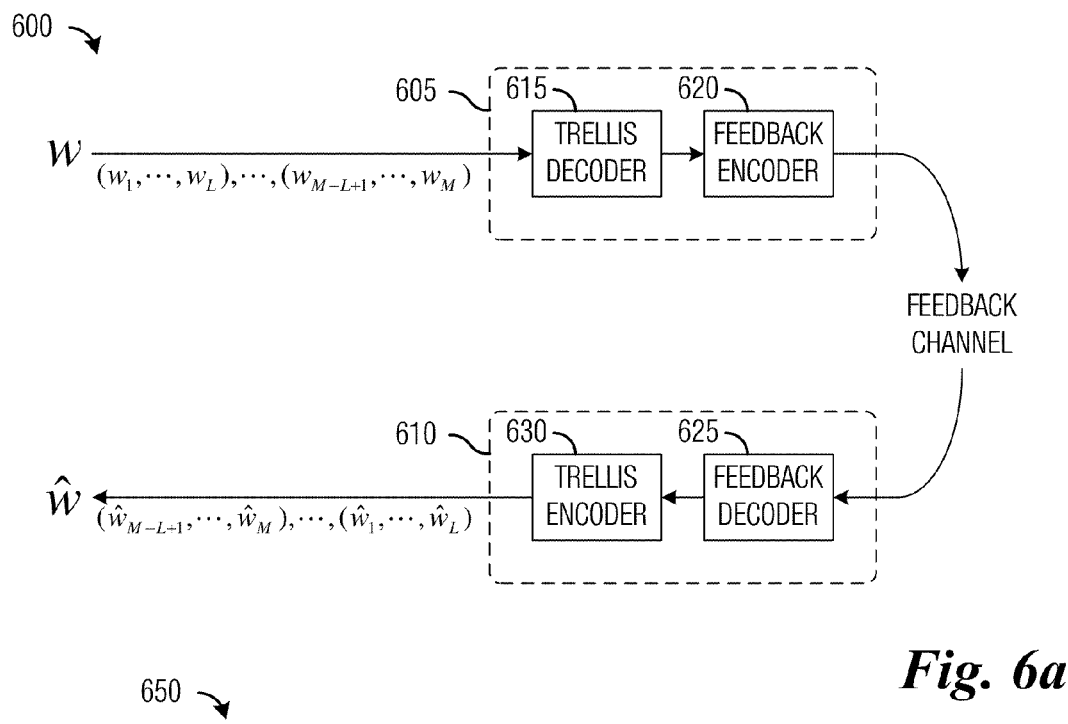
*Fig. 6a*
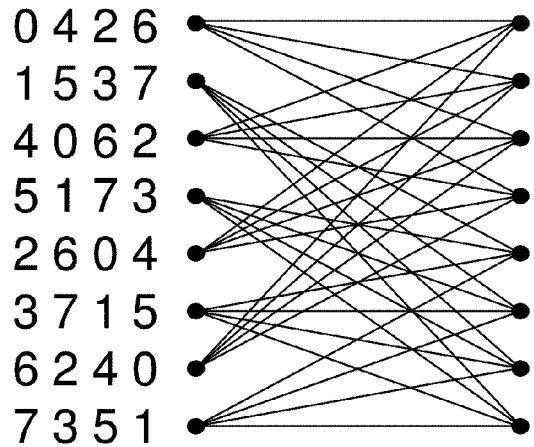
*Fig. 6b*
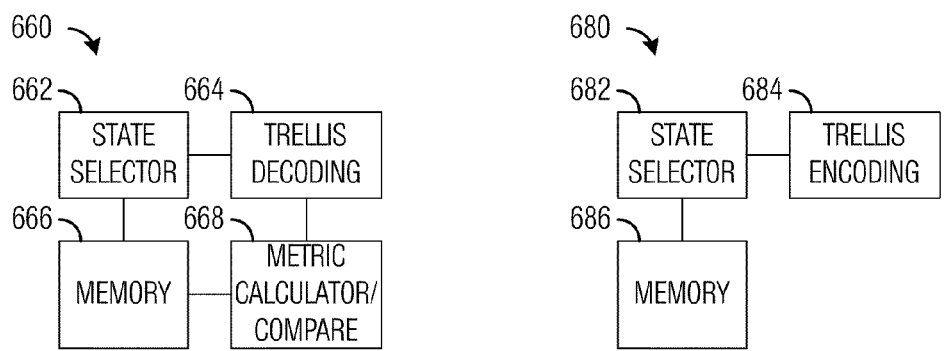
*Fig. 6c*          *Fig. 6d*

SYSTEM AND METHOD FOR QUANTIZATION OF CHANNEL STATE VECTORS

TECHNICAL FIELD

The present invention relates generally to wireless communications, and more particularly to a system and method for the quantization of channel state vectors.

BACKGROUND

Generally, in a multiple input, multiple output (MIMO) wireless communications system, it is beneficial for a transmitter to have some knowledge of channel state information of a communications channel between itself and a receiver. One form of channel state information, as implemented in technical standards such as the Third Generation Partnership Project (3GPP) Long Term Evolution (LTE), is a combination of a precoding matrix index (PMI), a channel quality index (CQI) and a rank indicator (RI).

Typically, channel state information may be provided in the form of feedback from the receiver. However, due to overall bandwidth utilization issues, a feedback channel usually has limited bandwidth as well as a low reliable transmission rate. Therefore, the channel state information may need to be quantized or otherwise reduced in size prior to being fedback. Predefined codebooks containing codewords at both the transmitter and the receiver is a commonly used technique to reduce feedback channel overhead by allowing the receiver to feedback an index to a codeword in the codebook rather than the codeword itself.

In multi-cell downlink transmissions, multiple base stations may simultaneously transmit to a single mobile station. In this situation, an effective number of transmit antennas may easily exceed four, which is usually the number of transmit antennas used in the design of codebooks in many technical standards. Furthermore, there is no standardized method for quantizing the PMI for a large number of transmit antennas.

Some of the technical standards also allow the use of relay nodes (RN). These technical standards may allow the RN and a base station to simultaneously transmit to a receiver. The receiver may need to quantize a joint communications channel (a communications channel between the RN and itself and a communications channel between the base station and itself), which may also exceed four transmit antennas.

SUMMARY OF THE INVENTION

These and other problems are generally solved or circumvented, and technical advantages are generally achieved, by embodiments of a system and method for the quantization of channel state vectors.

In accordance with an embodiment, a method for communications node operation is provided. The method includes measuring a communications channel between the communications node and a controller, generating channel state information based on the measurement, computing a bit representation of the channel state information, transmitting the bit representation to the controller, and receiving a transmission from the controller. The computing uses tail-biting trellis decoding, and the transmission makes use of the channel state information transmitted by the communications node.

In accordance with another embodiment, a method for communications node operation is provided. The communications node is served by a plurality of controllers. The method includes measuring a joint communications channel between the communications node and each controller in the plurality of controllers, generating channel state information based on the measurement, computing a bit representation of the channel state information, transmitting the bit representation to each controller in the plurality of controllers, and receiving a transmission from each controller in the plurality of controllers. The computing makes use of tail-biting trellis decoding, and the transmission makes use of channel state information transmitted by the communications node.

In accordance with another embodiment, a method for controller operation is provided. The method includes receiving feedback information from a communications node, reconstructing channel state information from the feedback information, adjusting a transmitter of the controller based on the reconstructed channel state information, and transmitting information to the communications node using the adjusted transmitter. The reconstructing uses tail-biting trellis encoding.

An advantage of an embodiment is that an efficient system and method for the quantization of channel state vectors for situations with a large number of transmit antennas is provided. The efficient quantization of channel state vectors reduces a computational requirement on receivers, thereby allowing the use of less powerful, less expensive, and lower power consuming processors in receivers. The less expensive and lower power consumption processors may reduce the cost of the receivers while extending their battery life.

A further advantage of an embodiment is that a smaller codebook is required. The smaller codebook may reduce storage requirements at both the receiver and the transmitter. Alternatively, a smaller codebook requirement may allow for better (more accurate) quantization performance if a larger codebook is used.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 5b is a diagram of an Ungerboeck trellis used in the system of FIG. 5a;

FIG. 6a is a diagram of a system for channel state information feedback using tail-biting trellis decoding and encoding;

FIG. 6b is a diagram of a stage of a tail-biting trellis;

FIG. 6c is a diagram of a detailed view of a trellis decoder;

FIG. 6d is a diagram of a detailed view of a trellis encoder;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a MIMO wireless communications system adherent to the 3GPP LTE technical standards. The invention may also be applied, however, to other wireless communications systems MIMO wireless communications system, such as LTE-Advanced compliant systems, as well as wireless communications systems that allow MIMO operations with a large number of transmit antennas and/or cooperative (or joint) MIMO operation with multiple base stations and/or relay nodes.

Figure 1:
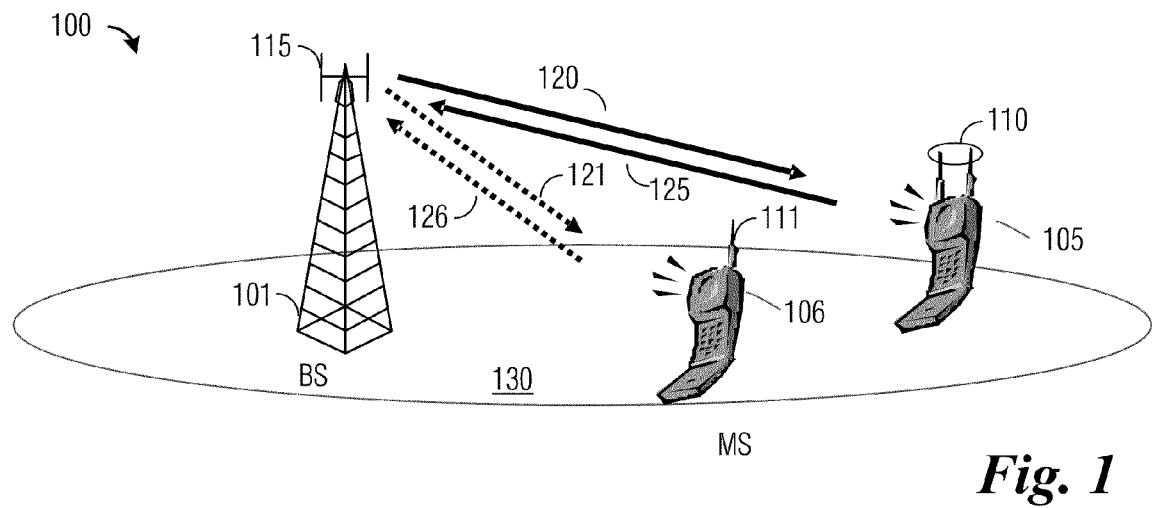
FIG. 1 is a diagram of a wireless communications system.

FIG. 1 illustrates a wireless communications system 100. Wireless communications system 100 includes a base station (BS) 101 and a plurality of mobile stations (MS), such as MS 105 and MS 106, which may be mobile or fixed. BS 101 and MS 105 and MS 106 communicate using wireless communication. BS 101 has a plurality of transmit antennas 115 while MS 105 and MS 106 may have one or more receive antennas 110 and 111. BS 101 sends control and data to MS 105 through a downlink (DL) channel 120 while MS 105 sends control and data to BS 101 through uplink (UL) channel 125. Similarly, BS 101 sends control and data to MS 106 through DL channel 121 and MS 106 sends control and data to BS 101 through UL channel 126.

MS 105 may send control information on UL channel 125 to improve the quality of the transmission on DL channel 120. BS 101 may send control information on DL channel 120 for the purpose of improving the quality of UL channel 125. A cell 130 is a conventional term for the coverage area of BS 101. It is generally understood that in wireless communications system 100 there may be multiple cells corresponding to multiple BSs.

Figure 2A:
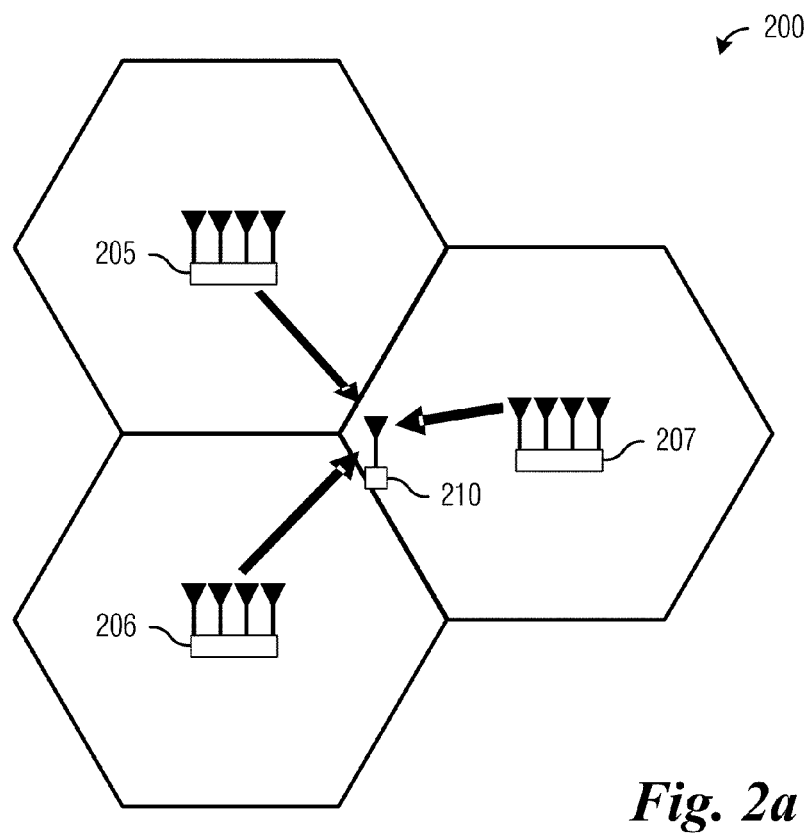
FIG. 2a is a diagram of a wireless communications system with cooperative MIMO operation with multiple base stations.

FIG. 2a illustrates a wireless communications system 200 with cooperative MIMO operation with multiple base stations. Wireless communications system 200 includes multiple base stations, such as BS 205, BS 206, and BS 207, operating in cooperative MIMO operation to transmit to a MS 210. A joint communications channel between the multiple base stations and MS 210 readily exceeds four transmit antennas when each of the multiple base stations has more than two transmit antennas.

Figure 2B:
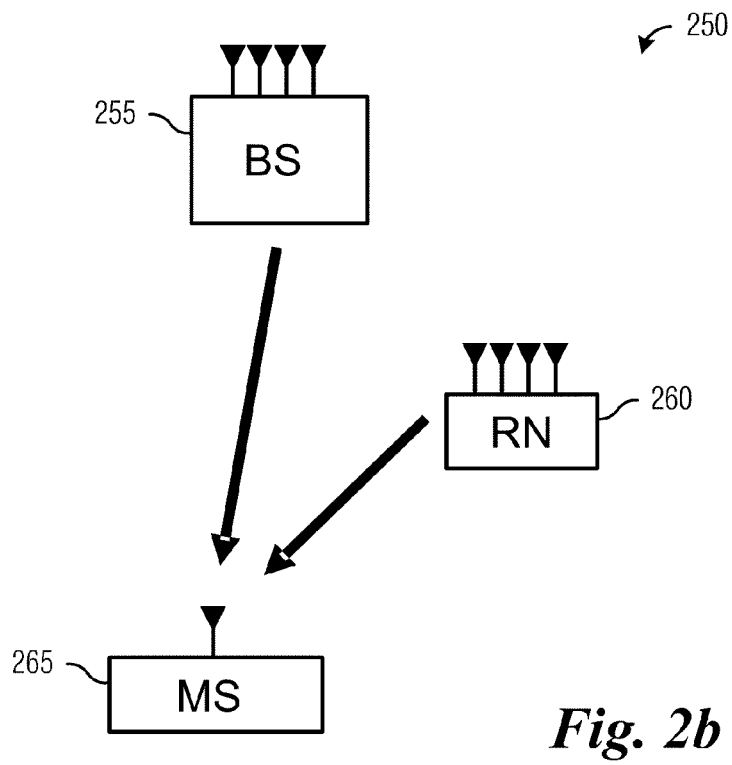
FIG. 2b is a diagram of a wireless communications system with cooperative MIMO operation with base stations and relay nodes.

FIG. 2b illustrates a wireless communications system 250 with cooperative MIMO operation with base stations and relay nodes. Wireless communications system 250 includes BS 255 and RN 260 operating in cooperative MIMO operation to transmit to a MS 265. A joint communications channel between BS 255 and RN 260 and MS 265 readily exceeds four transmit antennas when BS 255 and RN 260 has more than two transmit antennas each.

In order to maintain quantization accuracy, a size of a codebook used to quantize channel state information should grow according to:

$$\log_2 N = B(M-1),$$

where M is the number of transmit antennas (dimension), B is the number of quantization bits per transmit antenna, and N is the number of codewords in the codebook. In typical wireless communications systems, M is small (usually two to four), B is small (normally, one to two). Therefore, N is also small and may be exhaustively searched. Given a quantization accuracy B, N is exponential in M. Hence, for a large antenna system, exhaustive search through a codebook of N codewords may be prohibitively complex.

In general, an exhaustive search to quantize channel state information for a wireless communications system with dimension M, B bits per dimension, and codebook of size $N=2^{BM}$, may involve a comparison of a chordal distance of a normalized channel state information vector with each of the N codewords in the codebook (expressed as $w = \arg\max_f |h^* f|$, where w is the quantized channel state information vector, h is the channel vector, and f is a codeword from the codebook) and a codeword that is closest to the normalized channel state information vector may be reported. Therefore, exhaustive search may have a quantization complexity of $O(M2^{BM})$, where $O(.)$ indicates an order, and is exponential in M.

A method to reduce quantization complexity known as reduced exhaustive search for a wireless communications system with dimension M, divides the M dimensions into chunks with each chunk having dimension L (there are M/L chunks). Wireless communications system also has parameters of B bits per dimension, and codebook of size $N=2^{BL}$. Each of the M/L chunks may then be exhaustively searched as described above and the results combined. Therefore, reduced exhaustive search may have a quantization complexity of $O(M2^{BL})$ and is linear in M.

Figure 3:
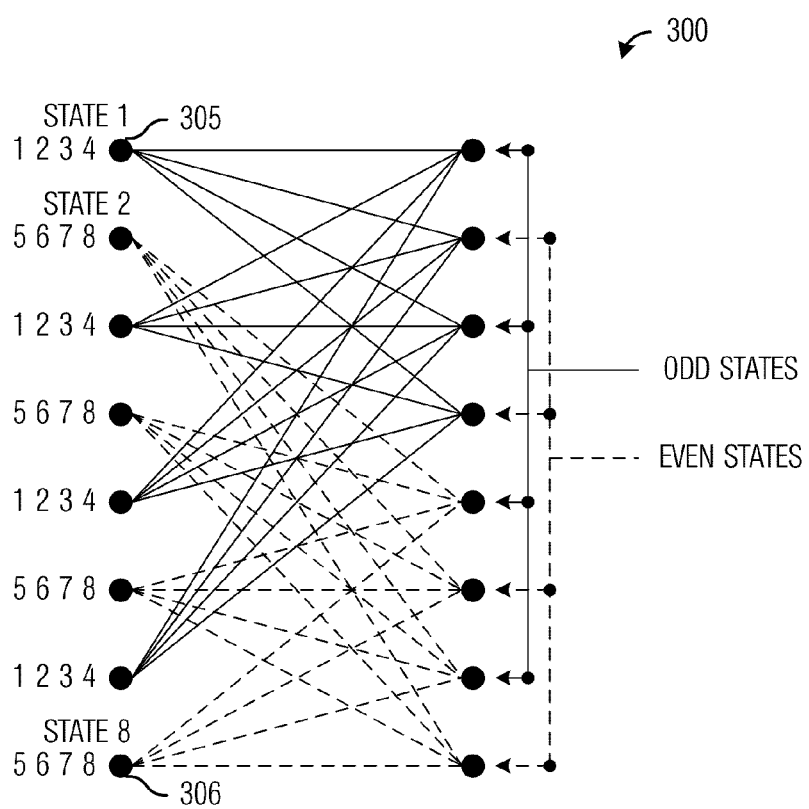
FIG. 3 is a diagram of an Ungerboeck trellis.

FIG. 3 illustrates an Ungerboeck trellis 300. As shown in FIG. 3, Ungerboeck trellis 300 has eight states (numbered from state one 305 to state eight 306). Numbers shown in front of a state, such as "1 2 3 4" in front of state one 305, may represent an output produced by Ungerboeck trellis 300 as input is provided to Ungerboeck trellis 300. A relationship between input and output may depend on an application of Ungerboeck trellis 300.

In general, each state of an Ungerboeck trellis has $2^b$ exiting branches and $2^b$ entering branches. Therefore, every stage in an Ungerboeck trellis represents b bits. There may be $2^{b+1}$ states per stage of an Ungerboeck trellis. As shown in FIG. 3, Ungerboeck trellis 300 represents b=two bits.

Additionally, in an Ungerboeck trellis, odd numbered states (e.g., states one, three, five, and seven in Ungerboeck trellis 300) may only transition to a first half of all possible states (e.g., states one, two, three, and four in Ungerboeck trellis 300). Similarly, even numbered states (e.g., states two, four, six, and eight in Ungerboeck trellis 300) may only transition to a second half of all possible states (e.g., states five, six, seven, and eight in Ungerboeck trellis 300).

Figure 4:
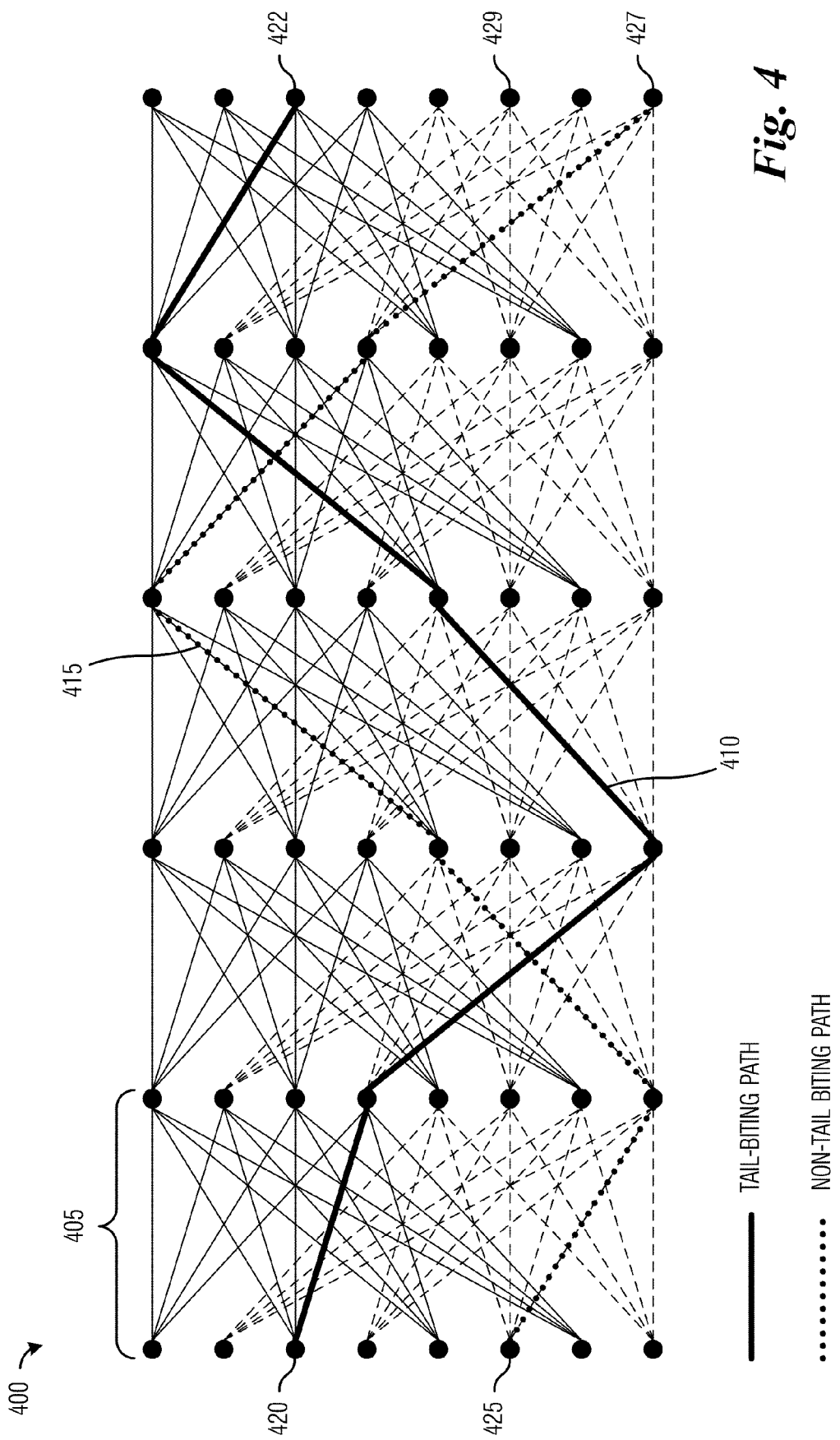
FIG. 4 is a diagram of a multi-stage trellis.

FIG. 4 illustrates a multi-stage trellis 400. Multi-stage trellis 400 includes multiple stages with each stage, such as stage 405, replicates trellis 300. As shown in FIG. 4, multi-stage trellis 400 includes five stages with each stage being a b=two bits Ungerboeck trellis as shown in FIG. 3.

Also shown in FIG. 4 are two possible paths through multi-stage trellis 400, first path 410 (shown as dark solid line) and second path 415 (shown as dark dotted line). First path 410 starts at state 420 and ends at state 422, while second path starts at state 425 and ends at state 427.

A tail-biting trellis may be defined as a trellis where only tail-biting paths are permitted. A tail-biting path may be defined as a path that is required to have the same beginning state and ending state. Therefore, first path 410 is a tail-biting path in a tail-biting trellis since states 420 and 422 are the same, while second path 415 is non-tail-biting path since states 425 and 427 are not the same. If second path 415 ended in state 429 rather than state 427, then second path 415 would be a tail-biting path.

Figure 5A:
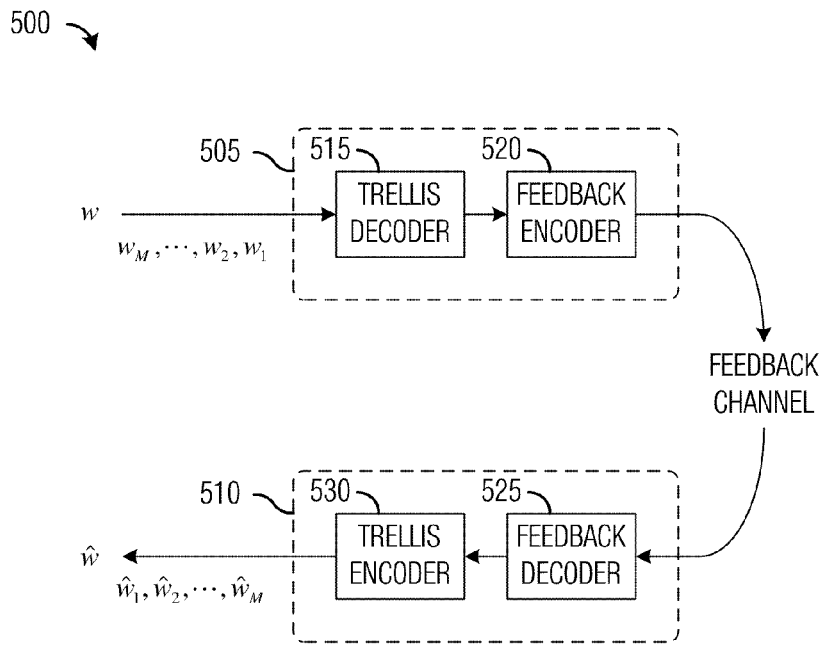
FIG. 5a is a diagram of a system for channel state information feedback using entry-by-entry trellis encoding and decoding.

FIG. 5a illustrates a system 500 for channel state information feedback using entry-by-entry trellis encoding and decoding. System 500 includes a feedback information generator 505 at a receiver (i.e., transmitter of feedback information) for converting channel state information ($w=(w_M, \ldots, w_2, w_1)$) into feedback information to be transmitted to a transmitter (i.e., receiver of feedback information) over a feedback channel. At the transmitter, system 500 includes a feedback information decoder 510 for converting the feedback information into a received version of the channel state information ($\hat{w}=(\hat{w}_1, \hat{w}_2, \ldots, \hat{w}_M)$).

Feedback information generator 505 includes a trellis decoder 515 that may be used to convert the channel state information ($w=(w_M, \ldots, w_2, w_1)$) into a quantized bit representation thereof. Entry-by-entry trellis decoding takes its input one entry at a time, such as $w_1$ may be first input entry, followed sequentially by entries $w_2$, $w_3$, and so on. Trellis decoding may be accomplished using techniques such as the iterative Viterbi algorithm wherein the Viterbi algorithm is executed several times until a solution is found or a maximum permitted number of times the Viterbi algorithm is executed is reached or a suboptimal algorithm that executes the Viterbi algorithm just twice wherein a first execution forms estimates and a second execution uses the estimates to find the solution.

A feedback encoder 520 may then be used to encode the quantized bit representation of the channel state information with any suitable channel coding technique, including uncoded modulations.

Feedback information decoder 510 includes a feedback decoder 525 to decode the received feedback information to produce a received version of quantized bit representation of the channel state information, and a trellis encoder 530 to convert the received version of the quantized bit representation of the channel state information to a received version of the channel state information ($w=(\hat{w}_1, \hat{w}_2, \ldots, \hat{w}_M)$) wherein the received version of the channel state information may differ from the channel state information due to interactions with the feedback channel. Entry-by-entry trellis encoding encodes a single entry at a time, such as $\hat{w}_1$ may be first encoded, followed sequentially be entries $\hat{w}_2$, $\hat{w}_3$, and so on. Trellis encoding may be accomplished by executing a trellis encoding algorithm twice wherein a first execution finds a proper starting state using reference information and a second execution uses the proper starting state to actually encode the trellis.

Requirements for entry-by-entry trellis decoding and encoding may include an integer number of bits per antenna (B) and an equal energy distribution per dimension. An extension to entry-by-entry trellis decoding and encoding exists wherein multiple entries are provided to the trellis instead of single entries.

Figure 5B:
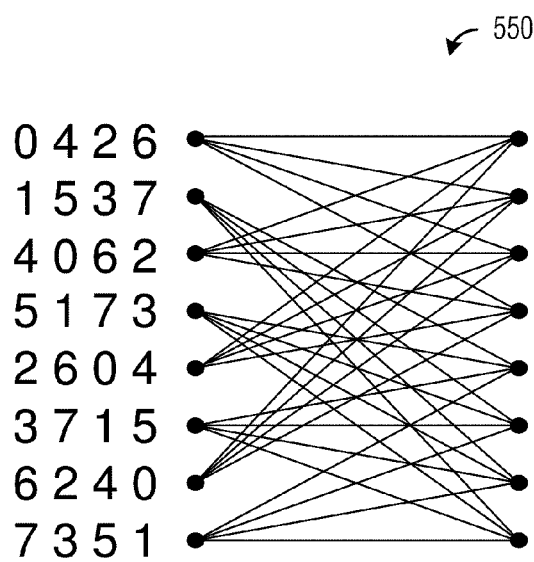
Figure 5C:
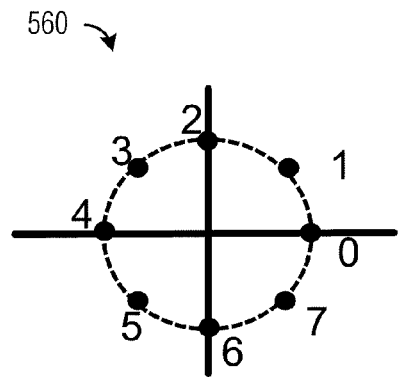
FIG. 5c is a diagram of an eight-PSK alphabet.

As an example, trellis decoder 515 and trellis encoder 530 may utilize an Ungerboeck trellis, such as Ungerboeck trellis 300 of FIG. 3, with B=two (2) bits per antenna, and an eight-PSK alphabet. FIG. 5b illustrates an Ungerboeck trellis 550 that may be used by trellis decoder 515 and trellis encoder 530 to quantize channel state information and FIG. 5c illustrates the eight-PSK alphabet 560. A metric used to quantize the channel state information may be a chordal distance between a partial vector w and a partial output vector. The trellis decoding and encoding may start in a first state (i.e., state one) of Ungerboeck trellis 550 with no restriction on an ending state, i.e., Ungerboeck trellis 550 does not have to be a tail-biting trellis. Therefore, the trellis quantization may have a computational complexity of $O(M2^{2B})$, where M is dimension of wireless communications system.

FIG. 6a illustrates a system 600 for channel state information feedback using tail-biting trellis decoding and encoding. Tail-biting trellis decoding and encoding may be an enhancement of entry-by-entry trellis decoding and encoding while adding a restriction that a tail-biting trellis must be used. Instead of decoding/encoding a single entry at a time, L dimensions of a length M channel state information vector w may be simultaneously decoded/encoded using an integer number of bits (BL), where M is divisible by L and L is strictly smaller than M. Therefore, the tail-biting trellis has M/L trellis stages. Any fractional number of bits per dimension (B) may be used, as long as BL is an integer value. Furthermore, equal energy per dimension is no longer a requirement. For tail-biting trellis decoding and encoding that operates on L entries at a time using BL bits, a tail-biting trellis with $2^{BL+1}$ states per stage may be used.

A codebook $F_L=[\vec{f}_1, \ldots, \vec{f}_N]$ with $N=G2^{BL}$ vectors (codewords) may be designed and known at both the transmitter and the receiver. Each codeword in the codebook has dimension L and G is a parameter indicating a number of times that the cardinality of codebook $F_L$, $|F_L|$, is greater than $2^{BL}$. The minimum value of G is two and $2^{BL}$ has to be divisible by G. FIG. 3 illustrates a single trellis stage of a tail-biting trellis for parameters B=1, L=2, and G=2.

In general, a codebook F for tail-biting trellis decoding and encoding, expressible as $$F=\{f_1, \ldots, f_{G2^{BL}}\},$$

may be generated by creating a codebook C with 1/G of a total number of entries:

$$C=\{c_1, \ldots, c_{2^{BL}}\}$$

with $2^{BL}$ vectors and then use G−1 unitary rotation matrices, $P_1, P_2, \ldots, P_{G-1}$, of dimension M×M to generate the other entries of the codebook: $F=\{C, P_1C, P_2C, \ldots, P_{G-1}C\}$. The codebook C may be generated by using a Grassmannian codebook that maximizes a minimum chordal distance among the distinct codebook vectors, using a structured codebook like a discrete Fourier transform codebook, a codebook from a technical standard, or so forth. The unitary rotation matrix P may be found using a variety of techniques, including Monte Carlo simulation to perform QR decomposition (also known as QR factorization) on a randomly generated Gaussian matrix and then using the Q matrix as the unitary rotation matrix to maximize a minimum chordal distance between two distinct vectors in F.

The tail-biting trellis shown in FIG. 3 has several properties: 1) every state has four exiting branches corresponding to two bits of input; 2) state transitions from an odd state will terminate in one of the first four states, similarly, state transitions from an even state will end in one of the last four states; 3) for a given input, state transitions originating from any of the odd states terminate at the same set of states, similarly, state transitions originating from any of the even states terminate at the same set of states; and 4) for a given input, the output symbol for state transitions originating from any of the odd states are identical, similarly, state transitions originating from any of the even states are also identical.

The properties in terms of B, L, and G are: 1) every state has $2^{BL}$ exiting branches corresponding to BL bits of input; 2) state transitions from any of the states $\{g+nG\}$ where $g=1, \ldots, 2^{BL}$ and $n=0, \ldots, G-1$, will terminate in one of the states $\{(g-1)2^{BL}+1, \ldots, g2^{BL}\}$; 3) for a given input, state transitions originating from any of the states $\{g+nG\}$, where $g=1, \ldots, 2^{BL}$ and $n=0, \ldots, G-1$, will terminate at the same state; and 4) for a given input and a given g, the output symbol for state transitions originating from states $\{g+nG\}$, where $n=0, \ldots, G-1$, are identical.

System 600 includes a feedback information generator 605 at a receiver for converting channel state information (w=$(w_1, \ldots, w_L), \ldots, (w_{M-L+1}, \ldots, w_M)$) in groups of L entries into feedback information to be transmitted to a transmitter over a feedback channel. At the transmitter, system 600 includes a feedback information decoder 610 for converting the feedback information into a received version of the channel state information ($\hat{w}=(\hat{w}_{M-L+1}, \ldots, \hat{w}_M), \ldots, (\hat{w}_1, \ldots, \hat{w}_L)$) in groups of L entries at a time. The ordering of the entries in the received version of the channel state information may be in a reversed order of the entries in the channel state information.

Feedback information generator 605 includes a trellis decoder 615 that may be used to convert the channel state information (w=$(w_M, \ldots, w_2, w_1)$) into a quantized bit representation thereof. Tail-biting trellis decoding takes as inputs L entries at a time, such as $(w_1, \ldots, w_L)$ may be first inputted, followed sequentially by a second group of L entries, such as $(w_{L+1}, \ldots, w_{2L})$, and so on. Trellis decoder 615 makes use of a tail-biting trellis known at both the receiver and the transmitter. At each tail-biting trellis stage, L dimensions (entries) of the channel state information (input to the tail-biting trellis) are decoded to output a BL-bit representation of a path through the tail-biting trellis stage.

If the tail-biting trellis decode/encode operate on L dimensions at a time using BL bits (BL is an integer value), then an Ungerboeck trellis with $2^{BL+1}$ states may be used in the decoding/encoding process. FIG. 6b illustrates a stage of a tail-biting trellis 650. Tail-biting trellis 650 may be used in a communications system with parameters L=two (2) and B=one (1). Referring back now to FIG. 6a, a feedback encoder 620 may then be used to encode the quantized bit representation of the channel state information with any suitable channel coding technique, including uncoded modulations.

Feedback information decoder 610 includes a feedback decoder 625 to decode the received feedback information to produce a received version of quantized bit representation of the channel state information, and a trellis encoder 630 to convert the received version of the quantized bit representation of the channel state information to a received version of the channel state information ($\hat{w}=(\hat{w}_{M-L+1}, \ldots, \hat{w}_M), \ldots,$ ($\hat{w}_1, \ldots, \hat{w}_L$)), wherein the received version of the channel state information may differ from the channel state information due to interactions with the feedback channel. Tail-biting trellis encoding encodes a group of L entries at a time, such as ($\hat{w}_{M-L+1}, \ldots, \hat{w}_M$) may be first encoded, followed sequentially by a second group of L entries, such as ($\hat{w}_{M-2L+1}, \ldots, \hat{w}_{M-L}$), and so on.

FIG. 6c illustrates a detailed view of a trellis decoder 660. Trellis decoder 660 may be an implementation of trellis decoder 615. Trellis decoder 660 includes a state selector 662 that may be used to select a starting state for trellis decoding. For example, state selector 662 may be used to select a starting state for each of the G stages of trellis decoding performed by trellis decoder 660, with each starting state being one of the one or more states in a single group of states. Trellis decoder 660 also includes trellis decoding unit 664 coupled to state selector 662. Trellis decoding unit 664 may implement a trellis decoding algorithm, such as Viterbi decoding.

Also coupled to state selector 662 may be a memory 666. Memory 666 may be used to store the channel state information to be converted, as well as a tail-biting trellis to be used in trellis decoding. Additionally, memory 666 may be used to store the outputs of the tail-biting trellis as each group of L dimensions of the channel state information are provided to the tail-biting trellis. A metric calculator/compare unit 668 may be used to calculate a metric that may be used to select which of the G quantized bit representations of the channel state information is actually the best representation of the channel state information.

FIG. 6d illustrates a detailed view of a trellis encoder 680. Trellis encoder 680 may be an implementation of trellis encoder 630. Trellis encoder 680 includes a state selector 682 that may be used to select a starting state for trellis encoding. State selector 682 may select the starting state by selecting the last GBL bits of the quantized bit representation of the channel state information and applying the selected GBL bits to a trellis encoding unit 684. Trellis encoding unit 684, coupled to state selector 682, may implement a trellis encoding algorithm, such as Viterbi encoding. Trellis encoder 680 also includes a memory 686, which may be used to store the received feedback information, the decoded feedback information, the selected GL bits, the reconstructed channel state information, and so forth.

Figure 7A:
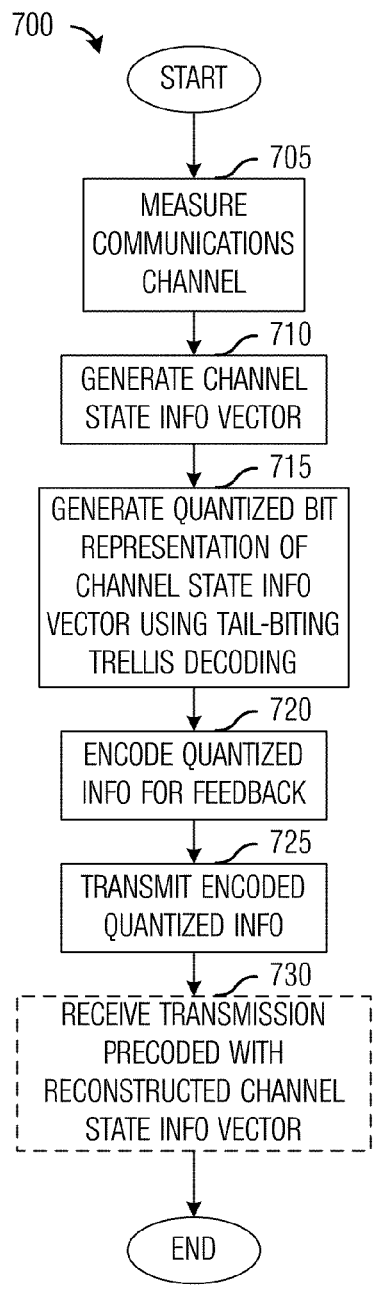
FIG. 7a is a flow diagram of MS operations in providing channel state information to a BS.

FIG. 7a illustrates a flow diagram of MS operations 700 in providing channel state information to a BS. MS operations 700 may be indicative of operations occurring in a MS, such as MS 105, as it provides channel state information to a BS, such as BS 101. MS operations 700 may occur periodically at specified times or it may occur upon an occurrence of an event, such as when an error rate reaches a specified threshold, a data throughput rate drops to a specified threshold, or so forth. MS operations 700 may continue while the MS is in a normal operating mode.

MS operations 700 may begin with the MS measuring a communications channel (block 705). The communications channel may be between the MS and the BS serving the MS. Alternatively, the communications channel may be a joint communications channel between the MS and one or more BS serving the MS and/or one or more RN serving the MS. When the MS is served by more than one BS or RN, the MS may individually measure the separate communications channels and then combine the measurements together. The communications channel may be measured by measuring a pilot sequence, a reference sequence, or other transmissions made by the BS. The measurements may be made over a short period of time or averaged over an extended period of time.

After measuring the communications channel, the MS may generate a channel state information vector from the measurements of the communications channel (block 710). The MS may also normalize the channel state information vector. The MS may then use tail-biting trellis decoding to generate a quantized bit representation of the channel state information vector (or the normalized channel state information vector (block 715). As discussed previously, tail-biting trellis decoding may process groups of L entries of the channel state information vector at each trellis stage, where each stage corresponds to BL bits of output per group of L entries of the channel state information vector. A detailed description of the tail-biting trellis decoding is provided below.

The multiple BL bits of output, representing the quantized bit representation of the channel state information vector may then be encoded (block 720) by a feedback encoder and transmitted to the BS (block 725). The BS may decode the feedback information to reconstruct a received channel state information vector (an estimate of the channel state information vector produced in block 710) for use in transmitting information to the MS. The MS may optionally receive a transmission that is precoded or beamformed using the received channel state information vector (block 730) and MS operations 700 may then terminate.

Figure 7B:
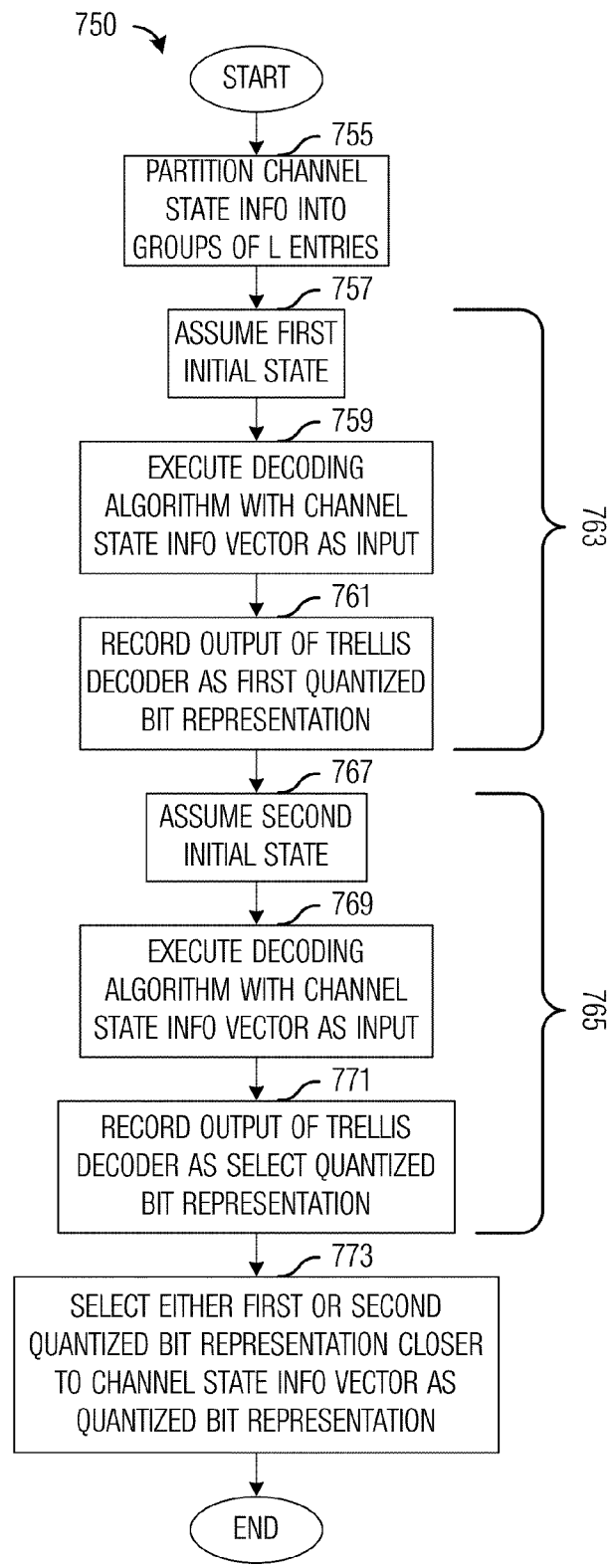
FIG. 7b is a flow diagram of MS operations in tail-biting trellis decoding to generate a quantized bit representation of the channel state information vector.

FIG. 7b illustrates a flow diagram of MS operations 750 in tail-biting trellis decoding to generate a quantized bit representation of the channel state information vector with G=2. MS operations 750 may be indicative of operations occurring in a MS as the MS generates feedback information for a communications channel to feedback to its controlling BS, RN, or both. MS operations 750 may be an implementation of block 715 of FIG. 7a, generating quantized bit representation of channel state information vector. MS operations 750 may occur periodically or upon an occurrence of an event while the MS is in a normal operating mode.

MS operations 750 may begin with the MS partitioning the channel state information vector w into groups of L entries (block 755). According to an embodiment, the channel state information vector w is M entries long and M is divisible by L. Each of the M/L groups of L entries may be an input to a stage of a tail-biting trellis used in tail-biting trellis decoding. A first initial state may be selected (block 757). As discussed previously, all states within a group are identical, so any state may be selected as the first initial state. According to an embodiment, a first state of a group is selected as the first initial state. For example, in a tail-biting trellis with two groups (even states and odd states), the first initial state may be state one, i.e., a first state of the odd states. The tail-biting trellis decoding may then be executed with the groups of L entries as input (block 759).

With the first initial state selected, the M/L groups of L entries may be provided as input to the tail-biting trellis. With each group of the L entries provided as input to the tail-biting trellis, a starting state transitions to an ending state of a stage of the tail-biting trellis and produces a BL bit output that may correspond to the group of L entries provided as input. For example, starting at state one of stage one of a tail-biting trellis, as a first group of L entries is provided to the tail-biting trellis as input, a transition is made to an ending state of stage one (and a starting state of stage two) with a first BL bit output corresponding to the first group of L entries produced. Then, as a second group of L entries is provided to the tail-biting trellis as input, a transition is made to an ending state of stage two (and a starting state of stage three) with a second BL bit output corresponding to the second group of L entries produced. The M/L BL bit outputs may be recorded as a first quantized bit representation of the channel state information vector (block 761). Blocks 757, 759, and 761 may collectively be referred to as a first stage of the tail-biting trellis decoding 763.

With first stage of the tail-biting trellis decoding 763 complete, a second stage of tail-biting trellis decoding 765 may commence. Second stage of tail-biting trellis decoding 765 may begin with a selection of a second initial state (block 767). Similar to the selection of the first initial state, the selection of the second initial state may involve the selection of any state within a single group of states. For example, in a tail-biting trellis with two groups (even states and odd states), if the first initial state was an odd state, then the second initial state may be state two, i.e., a first state of the even states. The tail-biting trellis decoding may then be executed with the groups of L entries as input (block 769).

With the second initial state selected, the M/L groups of L entries may be provided as input to the tail-biting trellis. With each group of the L entries provided as input to the tail-biting trellis, a starting state transitions to an ending state of a stage of the tail-biting trellis and produces a BL bit output that may correspond to the group of L entries provided as input. For example, starting at state one of stage one of a tail-biting trellis, as a first group of L entries is provided to the tail-biting trellis as input, a transition is made to an ending state of stage one (and a starting state of stage two) with a first BL bit output corresponding to the first group of L entries produced. Then, as a second group of L entries is provided to the tail-biting trellis as input, a transition is made to an ending state of stage two (and a starting state of stage three) with a second BL bit output corresponding to the second group of L entries produced. The M/L BL bit outputs may be recorded as a second quantized bit representation of the channel state information vector (block 771).

After second stage of tail-biting trellis decoding 765 completes, the two M/L BL bit outputs from each stage (the first quantized bit representation of the channel state information vector and the second quantized bit representation of the channel state information vector) may be selected by evaluating a metric, with a selected quantized bit representation of the channel state information vector being either the first or the second quantized bit representation of the channel state information vector that is closer to the channel state information vector (block 773). According to an embodiment, the metric used to select either the first or the second quantized bit representation of the channel state information vector may be a chordal distance metric, a Euclidean distance, or so on. For example, if the metric is a chordal distance or a Euclidean distance, then the quantized bit representation having a smaller metric may be selected. However, if the metric is such that the quality of the quantized bit representation is better when the metric is larger, then the quantized bit representation having a larger metric may be selected. If the metrics are equal, then either the first or the second quantized bit representation may be randomly selected. The tail-biting trellis decoding may have a computational complexity of $O(M2^{2BL})$. With the quantized bit representation of the channel state information vector selected, MS operations 750 may then terminate.

Although the discussion of tail-biting trellis decoding focuses on a two-stage algorithm that selects starting positions from two different groups of starting states (i.e., G=2), tail-biting trellis decoding may be applicable to any number of different groups G, such as two, three, four, five, and so forth. In a general case with the number of groups G not equal to two, the states in the tail-biting trellis may be divided into G groups and tail-biting trellis decoding may occur as a G-stage algorithm. Each stage of the G-stage algorithm may entail the selection of a state within a single group as an initial state, executing the tail-biting trellis decoding algorithm with the M/L groups of L entries starting at the initial state, and then saving the M/L BL bit outputs as a quantized bit representation of the channel state information vector. The tail-biting trellis algorithm may then compare the G different M/L BL bit outputs to select one as the bit representation of the channel state information vector. With G different groups, tail-biting trellis decoding may have a computational complexity of $O(GM2^{2BL})$. Therefore, the discussion of two-stages, two groups (even and odd), and so forth, should not be construed as being limiting to either the scope or the spirit of the embodiments.

Figure 8A:
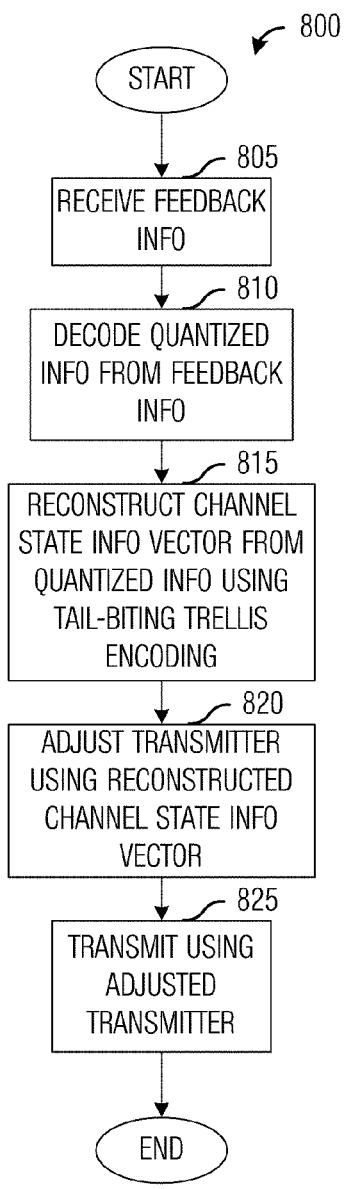
FIG. 8a is a flow diagram of BS operations in transmitting information to a MS.

FIG. 8a illustrates a flow diagram of BS operations 800 in transmitting information to a MS. BS operations 800 may be indicative of operations occurring in a BS, such as BS 101, as it transmits information to a MS, such as MS 105, using channel state information provided by the MS to precode the transmission. BS operations 800 may occur periodically, whenever the BS has a transmission to make, or upon an occurrence of an event, such as when an error rate reaches a specified threshold, a data throughput rate drops to a specified threshold, or so on. BS operations 800 may continue while the BS is in a normal operating mode.

BS operations 800 may begin with the BS receiving feedback information from the MS (block 805). Depending on channel conditions, the feedback information may or may not be encoded. If the feedback information is encoded, the BS may decode the feedback information (block 810).

From the feedback information or the decoded feedback information, the BS may reconstruct an estimate of a channel state information vector transmitted by the MS (block 815). The estimate of the channel state information vector may be the channel state information vector as transmitted by the MS with any interaction with the feedback channel. According to an embodiment, the BS may reconstruct the estimate of the channel state information vector using tail-biting trellis encoding. Tail-biting trellis encoding is discussed in greater detail below.

Using the reconstructed estimate of the channel state information vector, the BS may adjust its transmitter (block 820). Adjusting its transmitter may involve selecting a precoding or beamforming vector or matrix depending upon the dimension of the reconstructed estimate of the channel state information vector. The BS may then make use of its adjusted transmitter when it has information to transmit to the MS (block 825). According to an embodiment, the BS may serve a plurality of MSs and the BS may need to adjust its transmitter prior to transmitting to each of the MSs based on a reconstructed estimate of the channel state information vector associated for each MS. After transmitting information to the MS, BS operations 800 may then terminate.

Figure 8B:
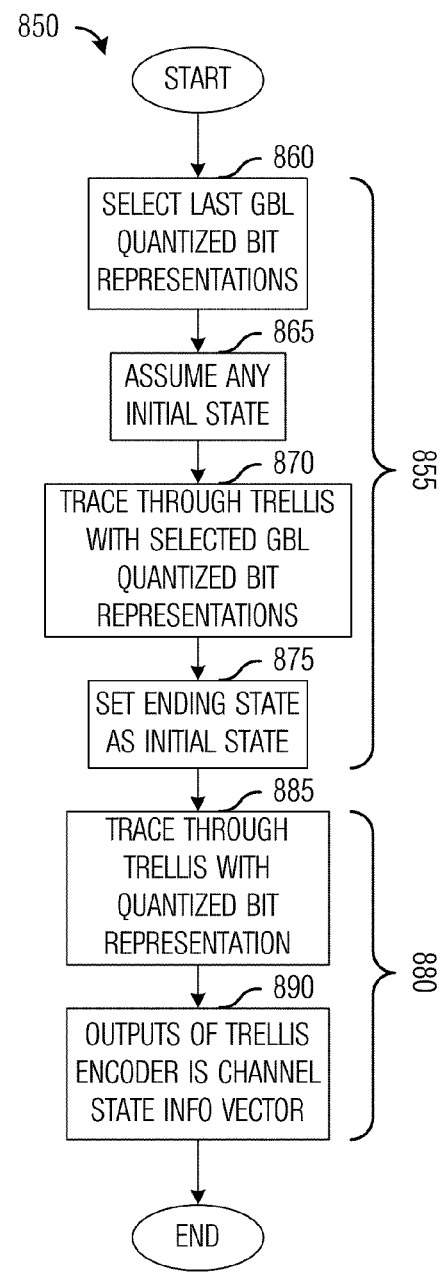
FIG. 8b is a flow diagram of BS operations in tail-biting trellis encoding to reconstruct an estimate of a channel state information vector.

FIG. 8b illustrates a flow diagram of BS operations 850 in tail-biting trellis encoding to reconstruct an estimate of a channel state information vector. BS operations 850 may be indicative of operations occurring in a BS, such as BS 101, as the BS reconstructs the estimate of the channel state information vector using tail-biting trellis decoding on a quantized bit representation of a channel state information vector. BS operations 850 may be an implementation of block 815 of FIG. 8a. BS operations 850 may occur periodically or upon an occurrence of an event while the BS is in a normal operating mode.

BS operations 850 may begin after the BS has received and decoded a quantized bit representation of the channel state information vector from the MS and may be a multi-stage process. A first stage may entail the BS determining a starting state for tail-biting trellis encoding 855. To determine the starting state, the BS may select the last GBL bits of the quantized bit representation of the channel state information vector, corresponding to the last G trellis stages (block 860). For example, if G=two and there are only odd and even groups of states, then the BS may select the last 2BL bits. The BS may then select any starting state of its tail-biting trellis (block 865) and apply the selected GBL bits as input (block 870). As the tail-biting trellis transitions from the selected starting state to an ending state based on the selected GBL bits, any output produced may be ignored. The ending state of the tail-biting trellis may then be selected as an initial state for tail-biting trellis encoding (block 875).

A second stage may entail the BS encoding the quantized bit representation of the channel state information vector to reconstruct the estimate of the channel state information vector 880. The encoding of the quantized bit representation of the channel state information vector may begin with the BS applying BL bits of the quantized bit representation of the channel state information vector and transitioning from a starting state of a stage to an ending state of the stage for each of the BL bits (block 885). As each of the BL bits is provided as input, a L-entry output is produced per trellis stage. The L-entry outputs may be saved as the reconstructed estimate of the channel state information vector (block 890). The L-entry outputs may need to be reordered to properly reconstruct the estimate of the channel state information vector and BS operations 850 may then terminate.

Figure 9:
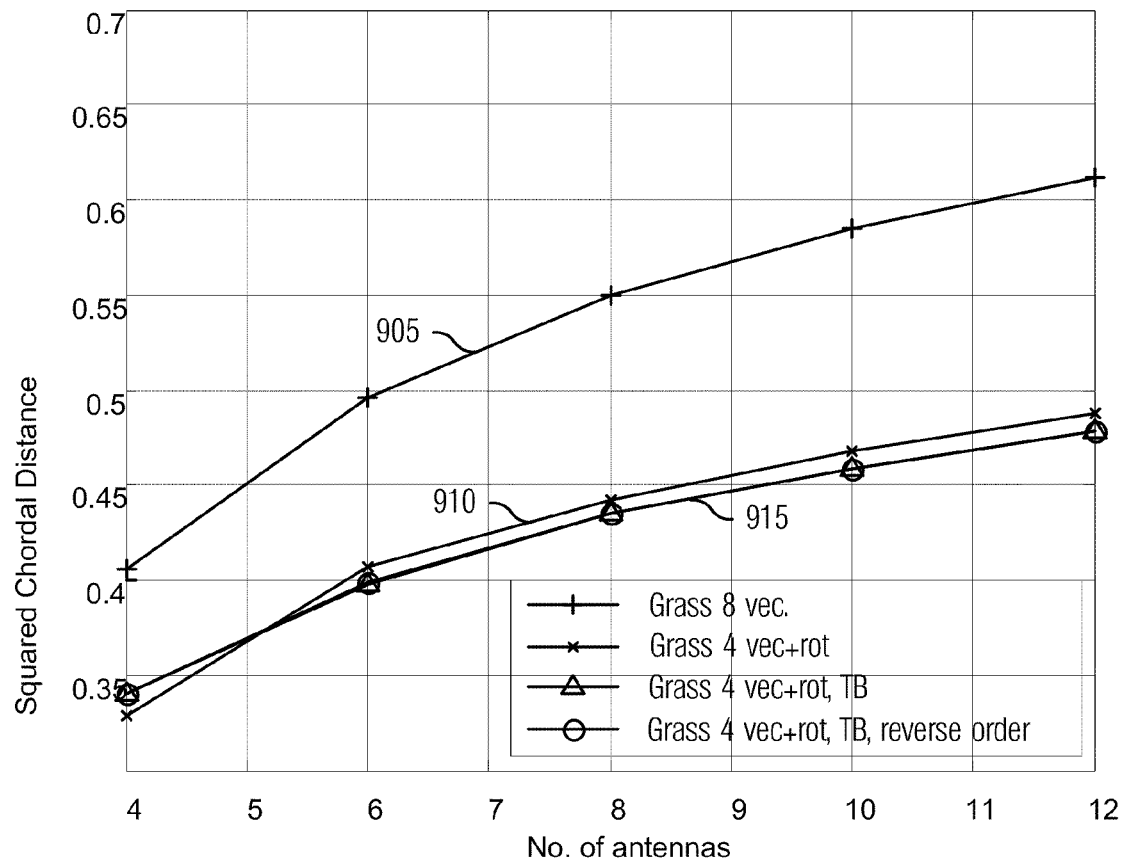
FIG. 9 is a data plot of squared chordal distance versus total number of transmit antennas.

FIG. 9 illustrates a data plot of squared chordal distance versus a total number of transmit antennas for a variety of codebook designs for different trellis decoding and encoding techniques. As shown in FIG. 9, the lower the squared chordal distance, the better the performance. A first trace 905 represents the performance of a communications system using an eight-vector Grassmannian codebook with entry-by-entry trellis encoding and decoding, and a second trace 910 represents the performance of a communications system using a four-vector Grassmannian codebook using the codebook generation technique described previously. Third and fourth traces, collectively shown as trace 915 because they are substantially equal, represent the performance of a communications system using a four-vector Grassmannian codebook using the codebook generation technique described previously and tail-biting trellis decoding and encoding with (third trace) and without (fourth trace) order reversing.

Although the embodiments and their advantages have been described in detail, it should be understood that various changes, substitutions and alterations can be made herein without departing from the spirit and scope of the invention as defined by the appended claims Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications node operation, the method comprising:
    measuring a communications channel between the communications node and a controller;
    generating channel state information based on the measurement;
    computing a bit representation of the channel state information, wherein the computing uses tail-biting trellis decoding;
    transmitting the bit representation to the controller; and
    receiving a transmission from the controller, wherein the transmission makes use of the channel state information transmitted by the communications node.

2. The method of claim 1, wherein computing a bit representation comprises:
    selecting a first initial state of a tail-biting trellis, wherein the first initial state is a state in a set of first states of the tail-biting trellis;
    providing the channel state information to the tail-biting trellis;
    recording outputs of the tail-biting trellis as a first quantized bit representation of the channel state information;
    selecting a second initial state of the tail-biting trellis, wherein the second initial state is a state in a set of second states of the tail-biting trellis;
    providing the channel state information to the tail-biting trellis;
    recording outputs of the tail-biting trellis as a second quantized bit representation of the channel state information; and
    selecting either the first quantized bit representation or the second quantized bit representation as the bit representation.

3. The method of claim 2, wherein the channel state information comprises an M dimensional vector with complex elements, and wherein computing a bit representation further comprises partitioning the channel state information into M/L groups of L bits, where M is an integer value and the dimension of the channel state information, L is an integer value, and M is divisible by L.

4. The method of claim 3, wherein providing the channel state information comprises providing a group of L dimensions of the channel state information at a time.

5. The method of claim 4, wherein providing a group of L dimensions of the channel state information results in a BL bit output, where B is an integer value representing a number of bits per dimension available to quantize the channel state information.

6. The method of claim 2, wherein selecting either the first quantized bit representation or the second quantized bit representation comprises:
    computing a first metric based on the first quantized bit representation and the channel state information;
    computing a second metric based on the second quantized bit representation and the channel state information;
    selecting the first quantized bit representation if the first metric is better than the second metric; and
    selecting the second quantized bit representation if the second metric is better than the first metric.

7. The method of claim 6, wherein selecting either the first quantized bit representation or the second quantized bit representation further comprises randomly selecting the first quantized bit representation or the second bit representation if the first metric is equal to the second metric.

8. The method of claim 6, wherein the first metric and the second metric are chordal distance metrics, Euclidean distance metrics, or a combination thereof.

9. The method of claim 1, further comprising prior to transmitting the bit representation, encoding the bit representation.

10. The method of claim 1, wherein generating channel state information comprises selecting a codeword from a codebook based on the measurement, where M is the dimension of the channel state information, the codebook has $G2^{BL}$ codewords, each codeword has dimension L, G is an integer value greater than or equal to two and is a number of times a cardinality of the codebook is greater than $2^{BL}$, $2^{BL}$ is divisible by G, B is a number of bits per dimension available to quantize the channel state information, and M is divisible by L.

11. The method of claim 10, wherein the codebook is generated by generating a first half codebook that has one-half the codewords in the codebook, wherein the codewords in the first half codebook maximizes a minimum chordal distance among distinct codewords, then applying a unitary rotation matrix to the first half codebook to produce a second half codebook, and then combining the first half codebook and the second half codebook to produce the codebook.

12. A method for communications node operation, wherein the communications node is served by a plurality of controllers, the method comprising:
    measuring a joint communications channel between the communications node and each controller in the plurality of controllers;
    generating channel state information based on the measurement;
    computing a bit representation of the channel state information, wherein the computing makes use of tail-biting trellis decoding;
    transmitting the bit representation to each controller in the plurality of controllers; and
    receiving a transmission from each controller in the plurality of controllers, wherein the transmission makes use of channel state information transmitted by the communications node.

13. The method of claim 12, wherein measuring a joint communications channel comprises:
    separately measuring a communications channel between the communications node and each controller; and
    combining the separate measurements into the measurement.

14. The method of claim 13, wherein separately measuring a communications channel comprises separately measuring a pilot sequence or a reference sequence transmitted by the communications node.

15. The method of claim 12, wherein at least one of the controllers in the plurality of controllers is a relay node.

* * * * *